Oct. 29, 1935.  F. W. EDWARDS  2,018,777

GAUGING TOOL

Original Filed Feb. 5, 1931

Inventor
Frank W. Edwards
by
Wm. W. Fincel
Attorney

Patented Oct. 29, 1935

2,018,777

UNITED STATES PATENT OFFICE 2,018,777

GAUGING TOOL

Frank W. Edwards, Chicago, Ill., assignor to The Ohio Injector Company of Illinois, Chicago, Ill., a corporation of Illinois Original application February 5, 1931, Serial No. 513,706. Divided and this application June 27, 1934, Serial No. 732,739

3 Claims. (Cl. 33—181)

This application is a division of my copending application filed February 5, 1931, Serial No. 513,706, and the invention relates to gauging tools for determining the adjustment of the various operative parts of pressure operated, or pressure responsive valves, particularly to those check valves commonly known as terminal checks, such as are used in pressure or force feed lubrication systems, for example such as the systems disclosed in my patents as follows:—Terminal valves for force feed lubricators, No. 1,808,978, dated June 9, 1931; Lubrication assembly, No. 1,904,295, dated April 18, 1933, and Lubrication assembly for locomotives, No. 1,917,191, dated July 4, 1933, and in my patent, with Fordyce B. Farnsworth, as joint inventor, for Lubricators, No. 1,886,659, dated November 8, 1932.

The object of the invention is to provide gauging tools whereby the accuracy of assembly and adjustment, the efficiency and the length of life of such valves may be enhanced.

In the valves for use with which the tools of this invention are adapted, there is a body provided with fluid inlet and outlet ports, one of same, usually the outlet port, carrying a valve seat, and arranged in the valve body is a pin valve and diaphragm assembly held in adjusted position by means of a bonnet which preferably houses a spring for variably applying pressure to the diaphragm and to the pin valve. It is for adjusting the pin valve assembly relatively to its seat in the valve body that the tools of the invention are particularly designed, as will be explained more fully hereinafter and finally claimed.

Figure 1:
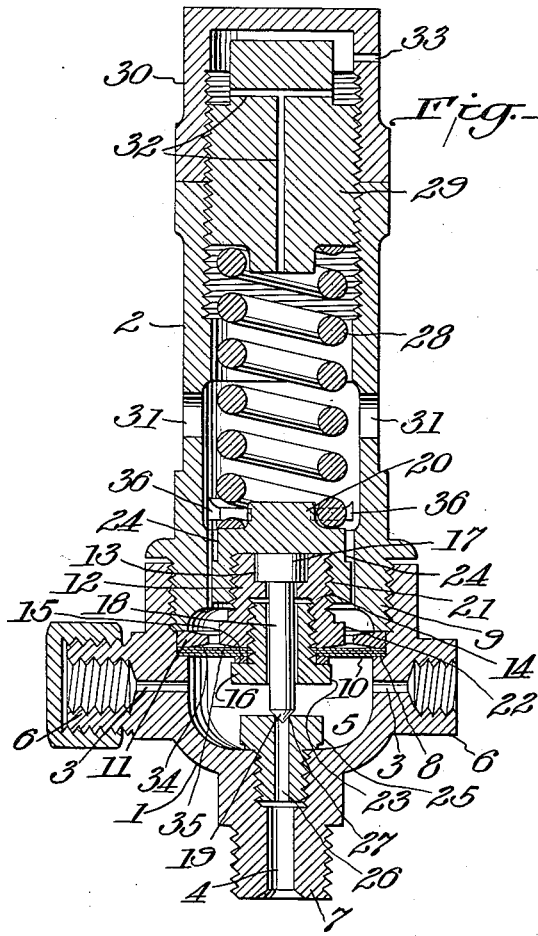
Figure 2:
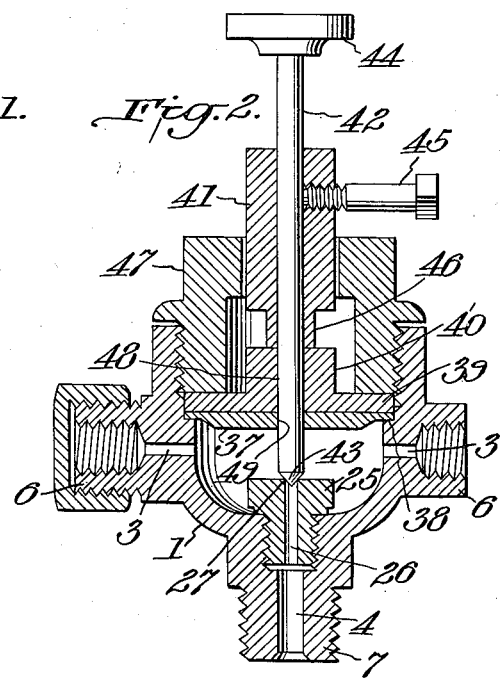
Figure 4:
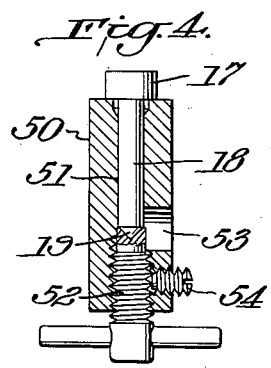
Figure 3:
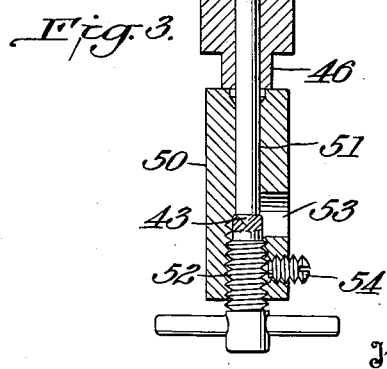

In the accompanying drawing illustrating the invention, in the several figures of which like parts are similarly designated, Figure 1 is an axial sectional elevation of a valve of the type referred to. Fig. 2 is a sectional elevation showing the valve body and tools for gauging the proper length and setting of the pin valve and its seat. Fig. 3 is a sectional elevation showing a further gauging operation and the tools therefor. Fig. 4 is a sectional elevation showing the gauging of the length of the pin valve as determined by the operations illustrated in Figs. 2 and 3.

The valve has a body 1 and a bonnet 2. The body 1 is provided with one or more inlet openings or ports 3 and an outlet opening or port 4, and all of these openings communicate with a pressure chamber 5 within the body and are adapted for connection with pipes or other conduits by means of screwthreaded or otherwise appropriately treated connecting bosses 6 and 7 respectively.

The body is counterbored to provide an annular shoulder or seat 8 and is screwthreaded above this seat to receive the complementally screwthreaded shank 9 of the bonnet 2. Upon the seat 8 rests the diaphragm 10, preferably of the multi-plate flat type, and it is held pressure tight against this seat by a retaining ring 11 against which bears the end of the screwthreaded shank 9.

Supported by the diaphragm 10 is the pin valve assembly. This assembly comprises a pin valve retainer 12 having a top recess 13 and a screwthreaded bore 14, a slip washer 15, a tubular diaphragm retaining member 16 screwed into the bore 14 and fixedly uniting the diaphragm 10 and pin valve retainer 12, a pin valve having a head 17 seating in the top recess 13 of the retainer 12 and a shank 18 passing through the member 16 and pointed at its end as indicated at 19, and a thrust cap 20 interiorly screwthreaded to engage the screwthreaded exterior 21 of the retainer 12.

The pin valve retainer 12 and the diaphragm retaining member 16 are provided with non-cylindrical, preferably hexagonal portions 22 and 23, respectively, whereby wrenches may be applied to them for effecting their assembly on the diaphragm 10, and the thrust cap 20 is provided with flattened surfaces, as indicated at 24 for a similar purpose.

A seat member 25 for the pin valve is threaded into the valve body 1 and has an axial passage 26 so formed at its upper end as to provide a proper seat 27 for the pointed end 19 of the pin valve. This passage 26 is preferably in axial alinement with the outlet port 4 and communicates therewith. Sufficient lateral clearance is provided in the recess 13 and in the bore of the diaphragm retaining member 16 to permit the pointed end 19 of the pin valve to properly register with its seat 27 in the seat member 25.

Obviously, the diaphragm 10 will normally hold the pin valve seated and the check valve thus closed, but in order that pressures in excess of those which may be withstood by the diaphragm may be handled by the check valve, the diaphragm is loaded by means of a compression spring 28 which seats upon the thrust cap 20 at one end and against an adjustable plug 29 at the other end. This plug 29 is screwthreaded into the upper end of the tubular bonnet 2 and may be fixed in adjusted position by means of a lock cap 30. By these means the check valve may be adjusted for operation at any pressure of a range of pressures determined by the stiffness of the diaphragm 10 and the stiffness of the spring 28 and its adjustment by means of the plug 29.

In order that no dashpot effect may be produced within the bonnet 2, openings 31 may be provided therein and, in addition, the plug 29 may be bored, as indicated at 32, and the cap 30 provided with a vent 33.

The diaphragm retaining ring 11 and the pin valve retainer 12 have their diaphragm contacting faces so shaped, as by bevelling, as indicated at 34 and 35, respectively, that upon flexure of the diaphragm 10 under the influence of pressure in chamber 5 there will be no tendency to shear the diaphragm between the edges of the members 11 and 12. Furthermore, upward flexure of the diaphragm is limited by stops 36 carried by the bonnet 2 and projecting into the path of movement of the thrust cap 20, with the top surface of which they are adapted to engage.

In valves of this general type as heretofore constructed, wherein the operating parts, particularly the pin valve and diaphragm assembly are enclosed and concealed when assembled in the body, it is difficult to determine whether or not the pin valve seats properly. This is particularly true in case replacements and repairs are necessary.

In valves constructed as just described in accordance with the invention specifically covered by my copending application Serial No. 513,706, referred to, this uncertainty is removed, and tools of this invention, as hereinafter particularly described, may be used to properly gauge the parts and insure their proper assembly and functioning.

It will be noted that when the pin valve and diaphragm assembly is properly made, as shown in Fig. 1, there can be no relative axial movement between the parts, particularly as regards movement between the pin valve 18 and its retainer 12. This latter is due to the fact that the head 17 of the pin valve is of such a length as to snugly fit between the bottom of the recess 13 and the face of the thrust cap 20, both of which contact with it. Consequently when the assembly is properly fixed in the body 1, with the seat member 25 in adjusted position, the distance between the bottom of the recess 13 and the seat 27 will remain constant so long as a diaphragm of a given thickness is used. If the thickness of the diaphragm is changed, this distance will be changed, but the change in length of pin valve may be accurately determined and a suitable pin valve supplied by gauging the distance from the seat 27 to the bottom of recess 13.

It will be noted, further, that the pin valve may be removed without disturbing the diaphragm, simply by removing the thrust cap 20. Thus, if necessary, the distance referred to may be gauged if, when otherwise properly adjusted, the valve fails to open when it should, or opens when it should not, or leaks.

In short, the only movement which can occur between the point 19 of the pin valve and its seat 27 is a movement dependent upon the diaphragm, whether due to pressure in chamber 5, as is desired, or due to substitution of a diaphragm of a thickness different from that for which the pin valve was originally fitted, and the latter may be gauged.

In Fig. 2 is shown a valve body 1, like that shown in Fig. 1, provided with a seat member 25 in proper adjusted position, and tools for effectively gauging the length of pin valve necessary for cooperation therewith when a diaphragm of predetermined thickness is to be used. Or, conversely, when a pin valve of predetermined length is to be used, the thickness of diaphragm necessary or the adjustment of the seat member 25 may be determined by use of these tools. However, as the proper operation of the valve is largely dependent upon the number of laminæ of the diaphragm, and hence its stiffness, and as the seat member 25 should be screwed down hard into fixed relation to the body, it is usually the length of the pin valve which is changed to suit the diaphragm and seat member.

The tools shown in Fig. 2, include a false diaphragm piece 37 of rigid plate form, machined at its edge 38 to a thickness simulating that of the diaphragm to be used, (a number of these having edges of different thicknesses may be furnished) a retainer disk 39 having a central lug 40, a gauge sleeve 41, and a gauge rod 42 having one end 43 pointed in the same manner as a pin valve and its other end provided with a head or finger piece 44. The gauge sleeve 41 is provided with a set screw 45 by which its adjustment relatively to the gauge rod 42 may be fixed, and has a reduced portion 46 at one end for a purpose later explained. These tools, particularly the false diaphragm 37 and retainer disk 39 are primarily adapted for the fitting up of new valves at the factory, but the gauge sleeve 41 and gauge rod 42 may be used in fitting pin valves and diaphragms for replacement and repair.

As hereinbefore stated, the several false diaphragm pieces 37 provided may have edges 38 of thicknesses to simulate diaphragms of various thicknesses or numbers of laminæ, and although Fig. 1 shows a diaphragm of three laminæ, Fig. 2, for the sake of variety, shows a false diaphragm piece having an edge of the thickness of a two-lamina diaphragm. Thus the pin valve as shown in Fig. 4 is shorter than that shown in Fig. 1 because it is of a length to fit the installation gauged by Fig. 2.

The thickness of the retainer disk 39 from its bottom surface to the top surface of the lug 40 is the same as the distance from the lower face of the pin valve retainer 12 in contact with the diaphragm to the surface of the bottom of the recess 13 therein. Thus the combined thicknesses of the machined edge of the false diaphragm piece and the retainer disk is equal always to the distance between the bottom of the recess 13 of the retainer 12 and the seat 8 of body 1 when a diaphragm 10 of which the false diaphragm piece 37 is a counterpart is used. This being the case, it will be apparent that by measuring from the seat 27 to the top surface of the lug 40 the length of the shank 18 of the pin valve suitable for the particular installation will be ascertained.

With the false diaphragm piece 37 and retainer disk 39 properly positioned in the body and resting upon the diaphragm seat 8 thereof, a false bonnet 47 is screwed down upon them to hold them in place. Then the gauge rod 42, freely slidable relatively to gauge sleeve 41 is passed through the holes 48 and 49 in the piece 37 and disk 39, respectively, and is seated with its pointed end 43 in the seat 27 of the seat member 25. Then the reduced portion 46 of the sleeve 41 is so adjusted upon the gauge rod that its end is permitted to contact with or seat upon the upper surface of the lug 40 of disk 39, and set screw 45 is tightened to hold the rod and sleeve in the adjustment thus obtained. Considering the just preceding descriptive matter, it will be apparent that the measurement thus taken gives the proper length for a pin valve to be used in installations requiring a two-lamina diaphragm. Other pin valve lengths may be ascertained by substituting other false diaphragm pieces of different thicknesses.

Referring now to Fig. 3, it will be seen that the measurement just obtained may be transferred to a gauge block 50 having an interior bore 51 in which is arranged a micrometer screw 52 the end of which is shaped to receive the pointed end 43 of the gauge rod 42. With the reduced end 46 of the sleeve 41 at the top of the gauge block and the pointed end of the gauge rod 42 extending into its bore 51, the micrometer screw is run in or backed off until the end 46 of the sleeve just seats upon the top of the gauge block, proper positioning of the pointed end 43 in the screw 52 being meanwhile observed through an opening 53 in the block. The set screw 54 is then tightened to maintain the proper setting of the micrometer screw 52.

With the established measurement thus transferred to the gauge block 50, it will be apparent that when the pin valves are made they may be tested for length of shank in the gauge block, as shown in Fig. 4, and any discrepancy as to length accurately determined.

It is, of course, desirable to test the actual installations of diaphragms and pin valve retainers to see that the pin valves will fit them and to ascertain what, if any, changes are required, and it is necessary to make similar gauge tests when repairs and/or replacements are necessary, and it is for accommodating the gauge sleeve 41 to this use that its lower end is reduced at 46, the reduced portion being of such a diameter and length that it will fit easily within the recess 13 of the pin valve retainer 12 and seat against the bottom of such recess.

Various changes other than and in addition to those specifically referred to are contemplated as within the spirit of the invention and the scope of the following claims.

What I claim is:—

1. Gauging tools for measuring the length of a headed pin valve forming a part of a pressure operated valve having a valve body, a diaphragm, a pin valve retainer having a rest for the lower surface of the pin valve head, and a pin valve seat, said tools including a false diaphragm piece corresponding to said diaphragm in edge thickness, a retainer disk simulating said pin valve retainer and having an upper exposed surface spaced from said false diaphragm piece a distance equal to the distance between the rest and the diaphragm, a gauge rod and a gauge sleeve, said diaphragm piece and said retainer disk provided with openings and adapted to be assembled in said body with said openings in axial alinement with said pin valve seat, said gauge rod adapted to be passed through said openings into engagement with said seat, and said gauge sleeve adapted to be engaged with the upper exposed surface of said retainer disk and secured to said rod to gauge the distance from the sleeve-engaged surface of said retainer disk to said pin valve seat.

2. Gauging tools for measuring the length of a headed pin valve forming a part of a pressure operated valve having a valve body, a diaphragm, a pin valve retainer having a rest for the lower surface of the pin valve head, and a pin valve seat, said tools including a false diaphragm piece corresponding to said diaphragm in edge thickness, a retainer disk simulating said pin valve retainer and having an upper exposed surface spaced from said false diaphragm piece a distance equal to the distance between the rest and the diaphragm, a gauge rod similar to the pin valve and having a similar pointed end and a gauge sleeve, said diaphragm piece and said retainer disk provided with openings and adapted to be assembled in said body with said openings in axial alinement with said pin valve seat, said gauge rod adapted to be passed through said openings so that its pointed end is brought into engagement with the upper exposed surface of and seated in said seat, and said gauge sleeve adapted to be engaged with said retainer disk and secured to said rod to gauge the distance from the sleeve-engaged surface of said retainer disk to said pin valve seat.

3. Gauging tools for measuring the length of a headed pin valve forming a part of a pressure operated valve having a pin valve retainer recessed to receive the head of the pin valve and providing in said recess a rest for the lower surface of the pin valve head, said tools including a gauge rod and a gauge sleeve, said rod having characteristics similar to those of said pin valve and adapted to be inserted in said retainer in place of same, and said sleeve provided at one extremity with a reduced portion adapted to enter the recess of said retainer, the end of said reduced portion adapted to contact with said rest.

FRANK W. EDWARDS.